Jan. 30, 1951 H. B. LEWIS ET AL 2,539,846
VENOM EXTRACTOR
Filed Jan. 8, 1945
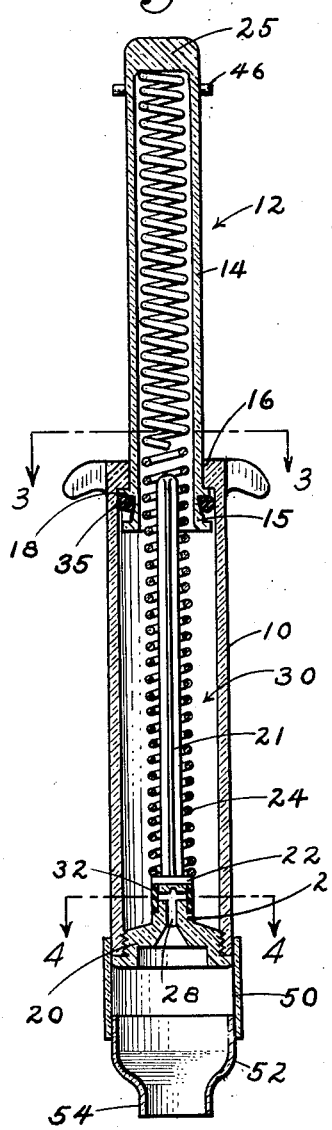
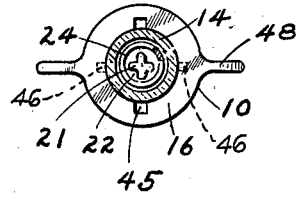
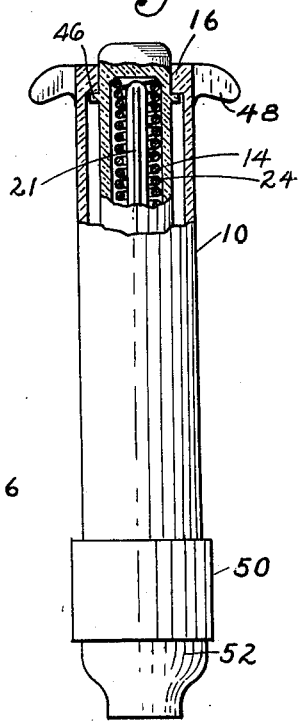
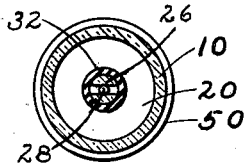
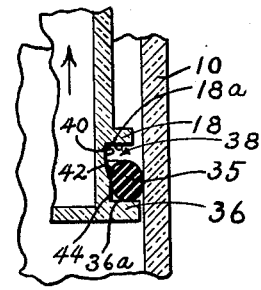
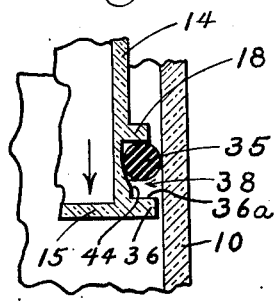
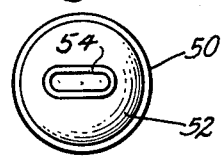
INVENTORS
HOWARD B. LEWIS
GLEN M. LARSON
BY
HARRIS, KIECH, FOSTER & HARRIS
FOR THE FIRM
ATTORNEYS Patented Jan. 30, 1951

2,539,846

UNITED STATES PATENT OFFICE 2,539,846

VENOM EXTRACTOR

Howard B. Lewis and Glen M. Larson,
Los Angeles, Calif.

Application January 8, 1945, Serial No. 571,909

12 Claims. (Cl. 230—190)

This invention relates to pumps; more particularly, one aspect relates to piston construction and another aspect to reciprocating pumping devices.

One object of the invention is to provide an efficient piston ring and groove construction for fluid pumping devices and another object of the invention is to provide a simple and efficient reciprocating pump construction, especially for small hand pumps such as represented by the venom extractor herein particularly disclosed.

A further object of the invention is to provide a piston construction wherein a resilient annular packing ring may be employed, such as a rubber packing of the doughnut type. A further object is to provide such a piston ring and groove construction that the rubber annulus type of packing may be caused to move into sealing relation upon a stroke in one direction and to move into fluid passing position upon a stroke in the opposite direction, so that the ring acts as a combined sealing ring and valve.

It is also an object of the present invention to provide a reciprocating pump, such as may be desirably employed to produce a partial vacuum, as in the case of a venom extractor, whereby a compression spring is employed to impel the piston upon its power stroke, and it is a further object of the invention to provide such a reciprocating pump in an arrangement whereby an elongated spring of much greater normal length than that of the pump cylinder may be used for the purpose of energizing the piston.

An additional object of the invention is to take advantage of the frictional contact of the rubber packing ring with the cylinder wall on the vacuum stroke to regulate the movement of the piston under the influence of the expansion spring which actuates the piston.

A still further object of the invention is to employ in a venom extractor a detachable nozzle construction which may be attached in airtight relationship to a pump cylinder, thereby adapting the construction to be disassembled for storage in kits convenient for packing in a small space. It is also an object of the invention to provide in a venom extractor a valve tending to trap in the pump cylinder fluids which have been drawn into the cylinder under influence of a partial vacuum developed during manipulation.

Another object of the invention is to provide a pump structure, for use as a venom extractor, for example, which may be produced almost entirely from plastic materials, the only metal required being that employed for the spring which energizes the piston.

Other objects and features of the generic invention disclosed will become apparent to those skilled in the art upon reference to the following specification and accompanying drawing wherein one embodiment is disclosed by way of illustration.

In the drawing:

Fig. 1 is a longitudinal sectional view of a preferred form of construction, showing the relationship of the parts when in extended position;

Fig. 2 is a view in side elevation, showing the parts in collapsed position, a portion of the various parts being broken away to reveal the internal arrangement;

Fig. 3 is a cross-sectional view, taken on the line 3—3 of Fig. 1, showing the plunger in cross section and the adjacent end of the body member in elevation;

Fig. 4 is a cross-sectional view, taken on the line 4—4 of Fig. 1;

Fig. 5 is a bottom view of the pump illustrated in Fig. 1;

Fig. 6 is an enlarged fragmentary longitudinal sectional detail, showing the position of the annular packer in compressed pumping relationship; and Fig. 7 is a view similar to that of Fig. 6, showing the annular packer in released position on the return stroke following a pumping stroke.

The extraction or suction pump, according to the preferred embodiment disclosed, comprises principally a pump cylinder 10 with which a plunger 12 cooperates. The plunger 12 comprises a hollow member 14 which serves as a piston rod and carries at its inner end a piston or plunger head 15. The hollow member 14 projects through a head 16 on the adjacent end of the pump cylinder 10, this head providing an annular shoulder adapted to be engaged by an annular flange 18 of the piston 15.

The end of the pump cylinder 10 opposite the head 16 is internally threaded to receive a removable plug 20 which acts as a closure and is provided with an integral elongated stem 21 at the base of which there is located an annular seat 22 receiving an end of an elongated expansion coil spring 24 which is disposed about the stem 21 and has its opposite end in engagement with an integral head 25 forming the outer extremity of the hollow member 14. The coil spring 24 thus tends to urge the plunger 12 into its outermost position, as illustrated in Fig. 1, when the plug 20 is in its normal operative position, as also illustrated in Fig. 1.

The central portion of the plug 20 is in the form of a shank 26 lying between the seat 22 and the body portion of the plug, and this shank is provided with a T-shaped fluid passage 28 leading therethrough whereby fluid may pass from the outer side of the plug 20 into a chamber 30 within the pump cylinder 10. To prevent the return of fluid from the chamber 30 back through the passage 28, an annular sleeve-shaped valve 32 is disposed about the shank 26 so as to cover the ends of the T-shaped passage. The valve 32 is preferably formed of rubber or similar resilient material.

In order to produce suction required for a vacuum pump of this type, such as the venom extractor illustrated, the piston 15 is provided with an annulus 35, preferably formed of rubber or other resilient material, which acts as a packing ring and which is preferably a conventional "doughnut packing," well known in the art. The annulus 35 is preferably circular in cross section, as best seen in Fig. 7, and is made of sufficiently soft material that it may be readily deformed when in the position illustrated in Fig. 6. The annulus 35 is retained between the annular flange 18 and a second annular flange 36 forming the inner extremity of the piston 15. An annular groove 38 thus is formed between the flanges 18 and 36 which receives the annulus 35. The annular back wall of the groove 38 is in the form of a cylindrical portion 40 of relatively small diameter which is connected by an annular sloping cam-like wall 42 with an annular cylindrical wall 44 of relatively greater diameter. The space between the cylindrical portion 40 and the adjacent inner wall of the pump cylinder 10 is large enough to accommodate the annulus 35 in undeformed condition, as shown in Fig. 7, but the annular space between the cylindrical wall 44 and the cylinder 10 is narrow enough to cause compression of the annulus 35 when in the position shown in Fig. 6. These positions of the annulus 35 are obtained respectively when the piston 15 is moved inward, as indicated in Fig. 7, and when moving outward, as indicated in Fig. 6, the cam-like wall 42 serving to compress the annulus 35 into its deformed condition shown in Fig. 6 where it seats against the inner face 36a of the flange 36.

The head 16 is provided with two diametrically disposed notches 45, best shown in Fig. 3, which are adapted to pass diametrically disposed lugs 46 on opposite sides of the outer end of the plunger 12, whereby the plunger 12 may be rotated from the position shown in Fig. 1 so as to align the lugs with the notches permitting the lugs to be passed through the notches 45 into the pump cylinder 10, and the plunger 12 may then be rotated by frictional engagement of the finger with the head 25 thereof so as to move the lugs 46 from alignment with the notches 45 to bring them under the shoulders provided by the head 16, thus locking the parts in collapsed position and retaining the spring 24 in compressed condition in readiness for future use. The pressing of the plunger 12 into the collapsed position of Fig. 2 is facilitated by ears 48 diametrically disposed on the opposite sides of the pump cylinder 10 adjacent its head 16, the ears 48 being adapted to be grasped by the fingers of the operator.

The end of the pump cylinder 10 opposite from that which receives the plunger 12 is adapted to receive a detachable sleeve 50 in air-tight engagement, and the sleeve 50 carries a suitable nozzle 52 whose engaging tip 54 is preferably reduced in cross-sectional area and has any suitable shape, such as the elongated form shown in Fig. 5. The nozzle 52 is preferably detachably carried by the sleeve 50, being fitted into the sleeve 50 in air-tight relationship. The sleeve 50 and the nozzle 52 are preferably formed of a plastic material having slight flexibility in order that they may effect air-tight seals where the sleeve 50 is placed on the pump cylinder 10 and where it is attached to the nozzle 52. Similarly, the pump cylinder 10, the plunger 12, and the plug 20, may be conveniently produced from plastic materials.

In the operation of the disclosed construction as a venom extractor, the sleeve 50 is applied to the end of the pump cylinder 10 carrying the plug 20, and the nozzle 52 is fitted on the sleeve 50. With the parts in the collapsed position shown in Fig. 2, the projecting head 25 of the plunger 12 is rotated, as by frictional contact of the operator's thumb therewith to align the lugs 46 with the notches 45, and the plunger is held in the depressed or collapsed position of Fig. 2 until the engaging tip 54 of the nozzle 52 is applied to cover the wound in sealing contact. The operator's thumb is then released from the head 25 of the plunger 12, permitting the coil spring 24 to expand and expel the plunger which slowly moves to the extended position shown in Fig. 1. Under this movement, the annulus 35 is shifted automatically from the position of Fig. 7 to the position of Fig. 6 to seal the piston 15 within the cylinder 10 so that partial vacuum is developed in the chamber 30. This serves to draw fluids from the wound into the nozzle 52 and the sleeve 50 under influence of the partial vacuum which is transmitted through the T-shaped passage 28 and past the sleeve-shaped valve 32. According to a preferred method of operation, the plunger is repeatedly depressed and released, whereby to perform a pumping action until the desired degree of evacuation of the wound is obtained.

The construction of the groove 38 in the piston 15 and its relationship to the annulus 35 and the inner wall of the cylinder 10 have special importance, not only in the vacuum pump application here particularly illustrated for use in venom extractors, but also for other pump uses either from the standpoint of vacuum pumps or pressure pumps, the relation of the parts in the latter with respect to the direction of stroke being merely reversed from that indicated in Figs. 6 and 7. Having special reference to Figs. 6 and 7, it is to be noted that the greater effective depth of the larger portion of the groove 38 between the inner wall of the cylinder 10 and the cylindrical portion 40 of smaller diameter, readily accommodates the cross-sectional area of the annulus 35 without compression or distortion, as shown in Fig. 7, with the result that air may readily pass the annulus 35 when in the position of Fig. 7. On the other hand, when the stroke of the piston 15 has changed from the direction indicated by the arrow in Fig. 7 to that indicated by the arrow in Fig. 6, the slight contact of the surface of the annulus 35 with the inner wall of the cylinder 10, together with the resultant contact with the cam-like wall 42, causes the annulus 35 to shift into the shallow portion of smaller effective depth at the smaller side of the groove 38 between the inner wall of the cylinder 10 and the larger diameter cylindrical wall 44. In this position, the annulus 35 is compressed and slightly distorted, as exaggeratedly shown in Fig. 6, and at the same time also bears against the inner face 36a of the adjacent flange 36 as a seat. Inasmuch as the face 36a is transversely arranged with respect to the cylinder so as to be substantially perpendicular thereto, the walls 42 and 44 being substantially spaced radially inward from the inner wall of the cylinder 10, there is no appreciable tendency for the annulus 35 to bind against the cylinder 10 and substantially interfere with or delay relative movement between the cylinder and the plunger 12. Instead, the cylindrical wall 44 serves merely to maintain the annulus 35 in its slightly distorted or compressed position so as to insure a tight seal after the annulus 35 has been moved by the cam-like wall 42 into such sealing position. Under these conditions, the annulus is so tightly seated against the wall 44 and upon the inner face 36a and is so tightly pressed against the cylinder 10 as to insure the development of a sufficient partial vacuum in the chamber 30 as the plunger 12 is forced outward under influence of the spring 24. Obviously, exactly the same action would serve to build up pressure in a suitable sealed chamber disposed ahead of the direction of movement of the annulus 35. When the piston 15 moves on the opposite stroke, the annulus 35 shifts to the opposite side of the groove 38 where it assumes a substantially floating position adjacent the retaining flange 18 and where it is held in its undistorted condition against a corresponding annular retaining face 18a provided by the flange 18, in which position air may pass readily between the annulus 35 and the cylinder 10.

Various modifications of the generic invention disclosed will become apparent to those skilled in the art, and it is intended, therefore, to protect all such variations as fall within the scope of the appended claims.

We claim as our invention:

1. A pump comprising in combination: a cylinder; a piston reciprocable in said cylinder, said piston having an annular groove relatively shallow at one side thereof and relatively deep at the other side thereof; and a packing ring in said groove, said packing ring being substantially narrower than said groove and having a thickness such that when in said one side of said groove said packing ring tightly engages said cylinder and when in said other side of said groove it loosely engages said cylinder to form a fluid-tight seal between said piston and said cylinder said other side of said groove providing a seat perpendicular to the axis of the piston and having a back wall parallel to said axis and joining said seat, said groove having a sloping back wall portion joining the deepest part of the groove with said parallel back wall.

2. A pump comprising in combination: a cylinder; a piston reciprocable in said cylinder; and a yielding annular packing carried by said piston and having a substantially circular cross section, said piston having an annular groove in which said packing seats for engagement with said cylinder, the width of said groove being greater than the width of said packing, one side of said groove having a cylindrical back wall portion of relatively small diameter and the other side of said groove having a cylindrical back wall portion of relatively greater diameter, said wall portions being connected by an annular cam-like sloping wall portion, said groove providing an annular seat disposed transversely of the adjacent cylinder wall and adjoining said wall portion of relatively greater diameter to receive said packing in deformed sealing relation against said cylinder wall.

3. A pump comprising in combination: a cylinder adapted to be held in the hand and having at one end an apertured head and at the other end a valved closure; a piston reciprocable in said cylinder; a yielding annular packing carried by said piston, said piston having an annular groove in which said packing seats for engagement with said cylinder, the width of said groove being greater than the width of said packing, the opposite sides of said groove providing a retaining face and a seating face both perpendicular to the axis of said piston, said faces being connected by an annular sloping back wall having a relatively small diameter adjacent said retaining face and a relatively great diameter adjacent said seating face whereby to compress said packing against said cylinder when engaging said seating face and to release the packing when adjacent said retaining face; a hollow plunger carrying said piston and projected through the aperture in said head; and expansion spring means in said hollow plunger and engaging said valved closure to extend said plunger.

4. A reciprocable piston having an annular groove adapted to receive an annular yielding packing for alternately compressing such packing against a cylinder wall and releasing the same, one side of said groove having a cylindrical back wall portion of relatively small diameter and the other side of said groove having a cylindrical back wall portion of relatively great diameter, said wall portions being connected by an annular cam-like sloping wall portion, said groove providing an annular seat disposed transversely of the adjacent cylinder wall and adjoining said wall portion of relatively great diameter to receive said packing in sealing relation against said cylinder wall.

5. A hand controlled suction pump adapted for the extraction of venom and the like and comprising in combination: a cylinder adapted to be held in the hand and having projecting ears to be engaged by the fingers; an apertured closure in one end of said cylinder adapted to be applied to an object to be placed under the influence of suction; an apertured head at the opposite end of said cylinder; a hollow plunger reciprocable in said cylinder and extending through said head into exposed position beyond said cylinder and head, thereby providing a thumb-receiving actuating member for forcing said plunger into said cylinder while the latter is held in the hand; a piston carried on said plunger within said cylinder and movable by said plunger; and an expansion spring having one end seated adjacent the closure end of said cylinder and having its other end extending into said hollow plunger to expel the latter on its suction stroke, said plunger and head being respectively provided with cooperating means to retain said piston within said cylinder against expansion of said spring.

6. A pump as in claim 5 wherein said closure carries a stem aligned with said hollow plunger and adapted to enter said plunger when said plunger is disposed within said cylinder and to center said spring within said cylinder when the plunger is extended.

7. A suction pump comprising in combination: a cylinder; an apertured plug closing said cylinder at one end; an apertured head at the other end of said cylinder, said head having a notch therethrough communicating with the aperture therein; a plunger reciprocable in said cylinder and extending through said apertured head; a piston carried on said plunger; spring means carried within said cylinder and engaging said plunger to expel the latter; and a lug carried externally by the outer portion of said plunger and adapted to pass through said notch and to be rotated into retaining position beneath said head.

8. A combination according to claim 7 wherein said plunger is hollow and said spring means extends from a position adjacent the plug end of said cylinder into said hollow plunger, said cylinder containing guide means within said spring means and projecting into said plunger when said plunger is telescoped into said cylinder.

9. A suction pump comprising in combination: a cylinder; a plunger reciprocable in said cylinder; a piston carried on said plunger within said cylinder and adapted to produce partial vacuum therein; spring means in said cylinder bearing against said piston to move the latter on its suction stroke, said piston having an annular groove provided with a cam-like annular back wall; and annular deformable packing means in said groove and movable by said back wall into sealing engagement with said cylinder upon actuation by said spring of said piston on its suction stroke.

10. A suction pump comprising in combination: a cylinder; a head in one end of said cylinder; a hollow plunger reciprocable in said cylinder and extending from said one end thereof and through said head; piston means carried by said plunger within said cylinder and adapted to produce partial vacuum within said cylinder; seat means provided on said piston means and providing an annular groove and an annular sloping back wall; a deformable packing ring in said groove and having a substantially circular cross section less than the groove width whereby to move between compressed and noncompressed positions by action of said sloping back wall as said piston reciprocates with said packing in operative engagement with the inner wall of said cylinder; closure means sealing the end of said cylinder opposite from said plunger, said closure means being provided with an internal shank having a fluid passage therethrough for entrance of fluid into said cylinder; and elastic annular valve means disposed about said shank and closing said passage to prevent escape of fluid from said cylinder through said passage.

11. A suction pump as in claim 5 wherein said piston is provided with seat means providing an annular groove and an annular sloping back wall, said groove receiving a deformable packing ring having an approximately circular cross section less than the width of the groove whereby said ring will move between compressed and noncompressed positions by action of the said sloping back wall as the piston reciprocates the said ring in operative engagement with the inner wall of said cylinder.

12. A suction pump as in claim 11 wherein a lug is externally carried by an outer portion of said plunger and said apertured head is provided with a notch adapted to pass said lug, said plunger and lug, when depressed to pass the lug through said notch into said cylinder, being rotatable to move said lug out of alignment with said notch into retaining position under an adjacent overhanging portion of said head.

HOWARD B. LEWIS.
GLEN M. LARSON.

REFERENCES CITED

The following references are of record in the file of this patent:

UNITED STATES PATENTS

| Number | Name | Date |
| --- | --- | --- |
| Re. 2,763 | Wood | Sept. 10, 1867 |
| 511,706 | Lamplugh | Dec. 26, 1893 |
| 940,751 | Thompson | Nov. 23, 1909 |
| 1,402,222 | Evans | Jan. 3, 1922 |
| 1,562,900 | Mahieu | Nov. 24, 1925 |
| 1,864,700 | Wade | June 28, 1932 |
| 2,276,098 | Saunders | Mar. 10, 1942 |
| 2,360,051 | Eweson | Oct. 10, 1944 |

FOREIGN PATENTS

| Number | Country | Date |
| --- | --- | --- |
| 4,540 | Great Britain | Feb. 26, 1903 |
| 8,149 | Great Britain | 1895 |